(12) United States Patent
Martinis et al.

(10) Patent No.: US 8,022,008 B2
(45) Date of Patent: Sep. 20, 2011

(54) HYDROGENATION CATALYST WITH IMPROVED TEXTURAL PROPERTIES

(75) Inventors: Jorge M. Martinis, Caracas (VE); Maria E. Valera, Caracus (VE); Jose R. Velasquez, Los Teques (VE); Angel R. Carrasquel, Los Teques (VE)

(73) Assignee: Intevep, S.A., Caracas (VE)

( * ) Notice: Subject to any disclaimer, the term of this patent is extended or adjusted under 35 U.S.C. 154(b) by 0 days.

(21) Appl. No.: 12/627,539

(22) Filed: Nov. 30, 2009

(65) Prior Publication Data

US 2010/0075828 A1  Mar. 25, 2010

Related U.S. Application Data

(62) Division of application No. 11/271,468, filed on Nov. 10, 2005, now abandoned.

(51) Int. Cl.
- *B01J 23/00* (2006.01)
- *B01J 21/00* (2006.01)
- *B01J 20/00* (2006.01)

(52) U.S. Cl. ........ 502/178; 502/240; 502/242; 502/258; 502/259; 502/260; 502/261; 502/406; 502/407; 502/439

(58) Field of Classification Search ............ 502/11, 502/177, 178, 240, 439, 242, 258–261, 406, 502/407

See application file for complete search history.

(56) References Cited

U.S. PATENT DOCUMENTS

| | | |
|---|---|---|
| 4,036,780 A | 7/1977 | Suzuki et al. |
| 5,187,140 A | 2/1993 | Thorsteinson et al. |
| 5,648,312 A | 7/1997 | Rivas et al. |
| 5,710,093 A | 1/1998 | Rivas et al. |
| 5,858,908 A | 1/1999 | Bogdan et al. |
| 2001/0048970 A1 | 12/2001 | Hagemeyer et al. |
| 2005/0154236 A1 | 7/2005 | Vanoppen |
| 2006/0084830 A1 | 4/2006 | Ryu |

*Primary Examiner* — Cam N. Nguyen
(74) *Attorney, Agent, or Firm* — Bachman & LaPointe, P.C.

(57) ABSTRACT

A method is provided for making a catalyst support, and includes the steps of providing an aqueous suspension of refractory inorganic oxide and refractory inorganic carbide; forming the suspension into droplets; exposing the droplets to a gelling agent whereby the droplets are at least partially solidified so as to provide substantially sphere-shaped portions of refractory inorganic oxide and refractory inorganic carbide; and drying and calcining the sphere-shaped portions so as to provide substantially spherical particles of catalyst support containing refractory inorganic oxide and refractory inorganic carbide. Catalytically active metal phases and hydrogenation processes using the catalyst are also described.

28 Claims, No Drawings

HYDROGENATION CATALYST WITH IMPROVED TEXTURAL PROPERTIES

CROSS-REFERENCE TO RELATED APPLICATIONS

This application is a divisional application of U.S. application Ser. No. 11/271,468, filed on Nov. 10, 2005, now abandoned.

BACKGROUND OF THE INVENTION

The invention relates to a hydrogenation catalyst, a method for making the catalyst, and a hydrogenation process utilizing the catalyst, wherein the catalyst has desirable physical characteristics.

Hydrogenation processes are used for processing various hydrocarbon feedstocks to obtain desirable products. Such processes utilize a catalyst to direct the reaction toward the desired products. The catalyst must be capable of withstanding the operating conditions of the process without rapidly losing effectiveness.

Numerous types of reactors can be used for carrying out the hydrogenation reaction. One type is known as an ebulliating bed reactor. An ebulliating bed reactor is characterized by a vessel containing a bed of the catalyst through which the feedstock is passed, typically from the bottom toward the top of the reactor. This results in a bed of the catalyst suspended in the medium and subjected to continuous collisions. The catalyst itself remains inside the reactor.

One problem encountered in the art with ebulliating reactors is the attrition rate of the catalyst contained in the reactor. That is, the catalyst tends to break down to smaller particles or fines after any significant amount of use.

U.S. Pat. No. 5,710,093 to Rivas et al. is drawn to a hydrogenation catalyst, and utilizes a process which produces spherical catalyst bodies that have good process properties and are resistant to attrition. Even greater improvements in the activity, heat dissipation and attrition resistance of the catalyst are of course desirable.

It is therefore a primary object of the present invention to provide a catalyst system wherein the catalyst particles are resistant to attrition.

It is a further object of the present invention to provide a catalyst having good heat dissipation properties so as to assist in dissipating heat generated by the exothermic hydrogenation reaction.

It is a still further object of the present invention to provide a catalyst system which has excellent activity and selectivity toward desirable hydrogenation reactions for converting a carbon monoxide feedstock to $C_2+$ hydrocarbons.

Other objects and advantages of the present invention will appear hereinbelow.

SUMMARY OF THE INVENTION

According to the present invention, the foregoing objects and advantages have been readily attained.

According to the invention, a method is provided for making a catalyst support, wherein the method comprises the steps of providing an aqueous suspension of refractory inorganic oxide and refractory inorganic carbide; forming the suspension into droplets; exposing the droplets to a gelling agent whereby the droplets are at least partially solidified so as to provide substantially sphere-shaped portions of refractory inorganic oxide and refractory inorganic carbide; and drying and calcining the sphere-shaped portions so as to provide substantially spherical particles of catalyst support containing refractory inorganic oxide and refractory inorganic carbide.

Still further according to the invention, catalyst support is provided which comprises substantially spherical particles of a substantially homogenous mixture of refractory inorganic oxide and refractory inorganic carbide, the support having a solid surface area of at least about 65 $m^2$/g, a particle size of at least about 0.1 mm and preferably between about 0.1 and about 3 mm, a pore volume of at least about 0.2 cc/g, and an average pore diameter of at least about 150 Å.

In further accordance with the invention, a process is provided for hydrogenation of a carbon monoxide feed which method comprises the steps of providing a catalyst system comprising a catalyst support and a catalytically active metal phase on the catalyst support, wherein the catalyst support comprises substantially spherical particles of a substantially homogenous mixture of refractory inorganic oxide and refractory inorganic carbide, the support having a solid surface area of at least about 65 $m^2$/g, a particle size of at least about 0.1 mm and preferably between about 0.1 and about 3 mm, a pore volume of at least bout 0.2 cc/g, and an average pore diameter of at least about 150 Å, and the catalytically active metal phase comprising at least one first metal selected from Group 4 of the periodic table of elements, and at least one second metal selected from the group consisting of Groups 8, 9 and 10 of the periodic table of elements; providing a carbon monoxide feed; and exposing the feed to the catalyst at hydrogenation conditions so as to convert the feed into a product comprising $CH_4$, $CO_2$ and $C_2^+$. The process of the present invention advantageously produces a conversion rate of at least about 60% vol. of the feed.

DETAILED DESCRIPTION

The invention relates to a hydrogenation catalyst, a method for making the catalyst, and a hydrogenation process utilizing the catalyst wherein the catalyst has excellent activity toward desired hydrogenation products and good properties in connection with the dissipation of heat. The hydrogenation catalyst of the present invention includes a catalyst support having desirable properties, and a catalytically active metal phase on the support which further provides the desired hydrogenation activity. According to the invention, the catalyst support is produced in the form of substantially spherical particles of a substantially homogenous mixture of refractory inorganic oxide, preferably silica, and refractory inorganic carbide, preferably silicon carbide.

The support advantageously has a solid surface area of at least about 65 $m^2$/g, a particle size of at least about 0.1 mm and preferably between about 0.1 and about 3 mm, a pore volume of at least bout 0.2 cc/g, and an average pore diameter of at least about 150 Å.

According to the invention, a method is also provided for making the catalyst and catalyst support of the present invention.

The present method starts with provision of a suspension or slurry of silica, preferably colloidal or amorphous silica in water. Such a suspension or slurry can be readily prepared in many ways well known to a person of ordinary skill in the art. One preferred method for preparing the suspension is to mix a water soluble refractory inorganic salt, for example sodium silicate, with water to provide the desired suspension.

It is preferable to keep the viscosity of the suspension at a level high enough to keep the silica in suspension, preferably at a viscosity of at least about 10 cp at 25° C. To this end, it may be desirable to add a viscosity agent to the suspension.

One example of a suitable viscosity agent is ethylene oxide polymer. According to the invention, this agent in concentration within the suspension of about 250 ppm, has been found to provide the desired viscosity. Of course, other viscosity agents would be well known to the person of ordinary skill in the art and are well within the broad scope of the present invention. The suspension at this point typically has a pH of between about 8 and about 10.

According to the invention, refractory inorganic carbide particles, preferably silicon carbide particles, are now mixed with the suspension. These particles preferably have an average particle size which is less than or equal to about 150 µm. This particle size has been found to help provide desirable surface area and pore volume properties in the end product. This mixture is mixed sufficiently to provide a substantially homogenously mixed aqueous suspension of silica and silicon carbide. This material is now ready for forming into the desired shapes or portions in accordance with the present invention.

In order to form the aqueous suspension into the desired spherical shape, the suspension is preferably formed into droplets by exposing the suspension to an inert organic phase, preferably in the presence of a non-ionic surfactant. The difference in surface tension causes the aqueous suspension to form droplets, the size of which can be controlled through the application of different mixing intensity. This mixing is carried out at least sufficiently to produce substantially uniform droplet sizes within a suitable droplet size distribution, for example, between about 0.1 and about 3 mm, and preferably until at least about 80% of the aqueous suspension is contained within a droplet size distribution between about 0.1 and about 0.4 mm in size. Of course, other methods known to a skilled artisan could be used to form the droplets well within the broad scope of the present invention.

In accordance with one embodiment of the invention, this mixing step is carried out sufficiently to produce an emulsion of the aqueous suspension in the organic phase.

While many different inert organic phases could be used, especially those which are inert under the catalyst forming conditions and when exposed to the aqueous suspension, preferred inert organic phases include but are not limited to kerosene, hexane, toluene, mineral oil, vegetable oil, alcohol and combinations thereof.

Before mixing with the aqueous suspension, it may be desirable to heat or otherwise provide the inert organic phase at a temperature of between about 70 and about 120° C.

Either before mixing with the organic phase, or during this mixing, preferably before mixing, a gelling agent is added to the aqueous suspension and serves to begin a partial solidification process of the colloidal silica and silicon carbide within the suspension such that when the desired droplets are formed, they are at least partially solidified.

Suitable gelling agents include but are not limited to ammonium salts, for example ammonium chlorides, nitrates, oxalates, sulfates, acetates and the like. While these gelling agents are preferred, it should of course be appreciated that other gelling agents would be known to a person of skill in the art.

Ammonium salts are particularly preferred because they cause gelling by forming siloxane bonds while at the same time creating positive counter ions to balance the negative surface charge of the silica source. These siloxane bonds within the resulting droplets and eventual catalyst support spheres are believed to be one factor in providing the desirable results obtained with the catalyst support of the present invention.

The partially solidified droplets of silica-silicon carbide are recovered from the organic phase, and then further processed to provide the catalyst support of the present invention. This involves drying and calcining as will be further described below so as to provide the desired catalyst support having desired properties.

According to the invention, the partially solidified droplets or spherical shaped portions are first aged and dried, preferably overnight or for a period of at least about 4 hours, at a temperature of between about 70 and about 120° C., preferably about 90° C. The aged and dried catalyst support spheres at this stage are now ready for calcining.

A first calcination is preferably carried out at a temperature of between about 350 and about 700° C., preferably a temperature of about 600° C., for a period of time sufficient to remove all traces of solvent and additives from the original starting materials. This material is then treated further in a hydrothermal treatment step.

The hydrothermal treatment step is preferably carried out at a temperature of between about 120° C. and about 250° C., and for a period of time sufficient to collapse small pores in the support so as to provide an average pore diameter of the support of at least about 150 Å, and preferably with no sign or indication of microporosity. This treated material is then preferably further calcined. The next calcinations is also preferably carried out at a temperature of between about 350 and about 700° C., preferably about 600° C., and produces a catalyst support in the form of substantially spherical shapes of substantially homogeneously distributed silica and silicon carbide, wherein the material has a surface area of at least about 65 m$^2$/g, a particle size of at least about 0.1 mm, preferably between about 0.1 and about 3 mm, a pore volume of at least about 0.2 cc/g, preferably between about 0.2 and about 0.7 cc/g and more preferably at least about 0.4 cc/g, and an average pore diameter of at least about 150 Å.

The starting silica and silicon carbide materials are preferably added to the aqueous suspension in amounts sufficient to provide the ending catalyst support material containing between about 90% and about 50% wt of silica based upon weight of the catalyst support material, and containing between about 10 and about 50% wt of silicon carbide based upon weight of the catalyst support material.

The catalyst support prepared according to the invention has excellent material hardness or attrition resistance and heat dissipation properties, even as compared to the material of the aforesaid U.S. Pat. No. 5,710,093. When subjected to an attrition test, material according to U.S. Pat. No. 5,710,093 showed a comparative attrition rate of 6.6, while material according to the invention showed less formation of fines and a comparative attrition rate of 6.0.

According to the invention, the final catalyst system is prepared by depositing a catalytically active metal phase on the support. According to the invention, a particularly suitable catalytically active metal phase has been found to include at least one metal selected from Group 4 of the periodic table of elements, and at least one additional metal selected from the group consisting of Groups 8, 9 and 10 of the periodic table of elements.

Preferred Group 4 metals are zirconium (Zr), titanium (Ti) and hafnium (Hf), and mixtures thereof, and zirconium is particularly preferred.

Preferred metals from Groups 8, 9 and 10 include cobalt (Co), iron (Fe), nickel (Ni), Ruthenium (Ru) and mixtures thereof, and cobalt is particularly preferred.

The catalyst system is preferably prepared so as to include Group 4 metal in an amount between about 0.1 and about 25% wt based upon weight of the catalyst system (combined weight of the support and metal phase). The catalyst system is also preferably prepared so as to provide the metal from Groups 8, 9 and 10 in an amount of between about 1 and about 50% wt based upon weight of the catalyst system.

The catalytically active metal phase can be provided on the support using any known technique, including but not limited to simultaneous or sequential impregnation, ion exchange and the like. Sequential impregnation with aqueous solution of the desired metal is particularly preferred.

In order to impregnate with the metal, an aqueous solution is preferably prepared by mixing a water soluble salt of the desired metal in water. Suitable examples of such salts include nitrates, oxalates, sulfates, acetates, acetylacetanates and mixtures thereof.

It is particularly preferred to impregnate the support first with the Group 4 metal, and then to calcine the Group 4 impregnated support at a temperature of between about 350 and about 700° C. This material is then impregnated with the Group 8, 9 and 10 metal and the resulting twice impregnated material is then calcined again to produce the final catalyst system of the present invention which, as set forth above, has excellent application in connection with hydrogenation processes.

As set forth above, hydrogenation processes are utilized to convert hydrocarbon feeds into more desirable products. According to the invention, one particularly preferred process is the hydrogenation of carbon monoxide (CO) to produce $CH_4$, $CO_2$ and $C_2^+$. In such a process, a carbon monoxide feed is exposed to hydrogen and the catalyst system of the present invention, typically in a reactor such as an ebulliated bed reactor as discussed above, at hydrogenation temperature and pressure. These process conditions preferably include a temperature of between about 200° C. and about 300° C., preferably about 220° C., and a pressure of between about 250 psig and about 450 psig, preferably about 360 psig, under a hydrogen to carbon monoxide ratio ($H_2$/CO) of between about 1 and about 5, preferably about 2, and a gas-hydrogen space velocity (GHSV) of between about 1.5 and about 5.5 SLPH/kg-cat-h, preferably about 3.5 SLPH/kg-cat-h. According to the invention, the hydrogenation process using the catalyst system of the present invention produces a conversion rate to desired products of at least about 60% vol. based upon volume of the initial feed.

Example 1

This example illustrates the preparation method of a catalyst support according to the invention. A series of batches of catalyst support constituted homogenously of spherical particles of amorphous silica and silicon carbide were prepared. Five suspensions of 305 g each were prepared by mixing a colloidal silica (prepared in the laboratory using sodium silicate) and mixing with silicon carbide having a particle size of less than or equal to 150 μm and ammonium salt as a gelling agent.

An ethylene oxide polymer (Poliox WSR-205, Union Carbide) was added to the colloidal silica at a concentration of 250 ppm, to adjust the viscosity of the suspension or slurry to a value exceeding 10 cp at 25° C.

The suspension was then transferred to a vessel containing an inert organic liquid and a non-ionic surfactant so that spherical droplets of catalyst support are formed. The ammonium salt begins the gelling process, thus, the spherically formed droplets of suspension are at least partially solidified. The spheres were then recovered and dried overnight at 90° C. The dried spheres were then calcined at 600° C. so as to remove all traces of solvent. The spheres were then hydrothermally treated at 180° C. and calcined again at 600° C. The resulting spherical particles had a pore volume of about 0.40 cc/g.

Five catalyst supports were prepared from the slurries in accordance with the above procedure. The characteristics of each support are set forth in Table 1, below.

TABLE 1

| SUPPORT | SURFACE AREA $m^2/g$ | PORE VOLUME cc/g | PORE DIAMETER Å |
|---|---|---|---|
| 1 | 69 | 0.38 | 191 |
| 2 | 73 | 0.67 | 282 |
| 3 | 78 | 0.48 | 224 |
| 4 | 77 | 0.47 | 209 |
| 5 | 78 | 0.43 | 197 |

Example 2

This example illustrates the preparation of the catalyst support with different particle size of silicon carbide in accordance with the above procedure as described in Example 1. Two supports were prepared with silicon carbide having particle size of less than 150 μm. The resulting spherical particles had an average particle size of about 0.25 mm. The characteristics of each support are in Table 2, below.

TABLE 2

| SUPPORT | SiC PARTICLE SIZE (μm) | SURFACE AREA ($m^2/g$) | PORE VOLUME (cc/g) | PORE DIAMETER Å |
|---|---|---|---|---|
| 6 | <100 | 78 | 0.40 | 188 |
| 7 | <50 | 80 | 0.49 | 202 |

Example 3

This example illustrates the preparation of a catalyst system in which the catalyst supports of Example 2 are impregnated with zirconium and cobalt. Two samples of catalyst support prepared in Example 2 were co-impregnated with the desired active metals using a pore saturation method with solutions containing $ZrO(NO_3)$.$H_2O$ and $Co(NO_3)_2$.$H_2O$. The catalysts were prepared so as to contain 2% of zirconium per weight and 15% of cobalt per weight. The impregnated supports were dried at 80° C. and calcined at 370° C. to oxidize the metal phase. The characteristics of each impregnated support are in Table 3, below.

TABLE 3

| CATALYST | SUPPORT | SURFACE AREA ($m^2/g$) | PORE VOLUME (cc/g) | PORE DIAMETER Å |
|---|---|---|---|---|
| A | 6 | 63 | 0.31 | 150 |
| B | 7 | 64 | 0.27 | 162 |

Example 4

This example illustrates the silicon carbide particle size effect inside the impregnated catalyst support. The conversion and product distribution is obtained from hydrogenation of a carbon monoxide feedstock at a temperature of 220° C., a pressure of 360 psig, a hydrocarbon to carbon monoxide ratio of 2, and GHSV of 3.5 SLPH/kg-cat-h. The results of each reaction, carried out in a CSTR reactor, are shown in Table 4, below.

TABLE 4

| CATALYST | SiC PARTICLE (μm) | PRODUCTS (% wt.) | | | CONVERSION % |
|---|---|---|---|---|---|
| | | $CH_4$ | $CO_2$ | $C_2^+$ | |
| A | <100 | 5.6 | 0.9 | 93.5 | 62.3 |
| B | <50 | 6.0 | 1.0 | 93.0 | 61.3 |

As shown, the process using a catalyst according to the invention produced conversion rates greater than 60% vol., with excellent selectivity to $C_2^+$ products.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

We claim:

1. A method for making a catalyst support, comprising the steps of:
    providing an aqueous suspension of refractory inorganic oxide and refractory inorganic carbide;
    forming the suspension into droplets;
    exposing at least one of the droplets and the suspension to a gelling agent comprising an ammonium salt wherein the droplets are at least partially solidified so as to provide substantially sphere-shaped portions of refractory inorganic oxide and refractory inorganic carbide; and
    drying and calcining the sphere-shaped portions so as to provide substantially spherical particles of catalyst support containing refractory inorganic oxide and refractory inorganic carbide.

2. The method of claim 1, wherein the spherical catalyst support has a solid surface area of at least about 65 $m^2/g$, a particle size of at least about 0.1 mm, a pore volume of at least bout 0.2 cc/g, and an average pore diameter of at least about 150 Å.

3. The method of claim 2, wherein the spherical catalyst support has a particle size of between about 0.1 and about 3 mm.

4. The method of claim 2, wherein the spherical catalyst support has a pore volume of at least about 0.4 cc/g.

5. The method of claim 2, wherein the spherical catalyst support has a pore volume of between about 0.2 and about 0.7 cc/g.

6. The method of claim 1, wherein the spherical catalyst support contains refractory inorganic carbide in an amount between about 10 and about 50% wt based upon total weight of the catalyst support.

7. The method of claim 1, wherein the step of providing an aqueous suspension comprises mixing a refractory inorganic salt with water to provide a refractory inorganic oxide suspension; and mixing the refractory inorganic carbide with the refractory inorganic oxide suspension to provide the aqueous suspension.

8. The method of claim 7, wherein the refractory inorganic oxide suspension has a pH of between about 8 and about 10.

9. The method of claim 1, wherein the refractory inorganic oxide comprises silica, and the refractory inorganic carbide comprises silicon carbide.

10. The method of claim 9, wherein the silicon carbide is provided in particles having an average particle size of less than or equal to about 150 μm.

11. The method of claim 1, wherein the forming step comprises the step of mixing the aqueous suspension with an inert organic phase.

12. The method of claim 11, wherein the inert organic phase is selected from the group consisting of kerosene, hexane, toluene, mineral oil, vegetable oil, alcohol and mixtures thereof.

13. The method of claim 12, further comprising the step of providing the inert organic phase at a temperature of between about 70 and about 120° C.

14. The method of claim 11, wherein the inert organic phase further comprises a non-ionic surfactant.

15. The method of claim 11, wherein the forming step comprises forming an emulsion of the aqueous suspension in the inert organic phase.

16. The method of claim 1, wherein the droplets have a droplet size of between about 0.1 and about 0.4 mm.

17. The method of claim 1, wherein the ammonium salt is selected from the group consisting of ammonium chlorides, nitrates, oxalates, sulfates, acetates and mixtures thereof.

18. The method of claim 1, wherein the drying and calcining step comprises aging and drying the spherical particles of catalyst for a period of at least about 4 hours at a temperature of between about 70 and about 90° C. to provide dry catalyst particles.

19. The method of claim 18, further comprising the step of calcining the dry catalyst particles at a temperature of between about 350 and about 700° C. to provide calcined catalyst particles.

20. The method of claim 19, further comprising the step of hydrothermally treating the calcined particles to collapse small pores and provide treated catalyst particles having an average pore diameter of at least about 150 Å.

21. The method of claim 20, further comprising the step of calcining the treated catalyst particles at a temperature of between about 350 and about 700° C. so as to provide the catalyst support.

22. The method of claim 1, further comprising the step of mixing a viscosity agent with the aqueous suspension so as to provide the suspension with a viscosity of at least about 10 cp at 25° C.

23. The method of claim 1, further comprising the step of providing a catalytically active metal phase on the catalyst support, wherein the catalytically active metal phase comprises at least one first metal selected from Group 4 of the periodic table of elements, and at least one second metal selected from the group consisting of Groups 8, 9 and 10 of the periodic table of elements.

24. The method of claim 23, wherein the at least one first metal is selected from the group consisting of Zr, Ti, Hf, and mixtures thereof, and wherein the at least one second metal is selected from the group consisting of Co, Fe, Ni, Ru and mixtures thereof.

25. The method of claim 24, wherein the at least one first metal is Zr and the at least one second metal is Co.

26. The method of claim 23, wherein the at least one first metal is present in an amount between about 0.1 and about 25% wt based upon total catalyst system weight, and wherein the at least one second metal is present in an amount between about 1 and about 50% wt based upon total catalyst system weight.

27. The method of claim 23, wherein the catalytically active metal phase is provided on the catalyst support by impregnation, ion exchange and combinations thereof.

28. The method of claim 23, wherein the catalytically active metal phase is provided by sequentially impregnating the catalyst support, and by calcining after each impregnation.

* * * * *